US008953797B2

(12) United States Patent
de Waal et al.

(10) Patent No.: US 8,953,797 B2
(45) Date of Patent: Feb. 10, 2015

(54) CONFIGURING AUDIOVISUAL SYSTEMS

(75) Inventors: Menno de Waal, Oosterhout (NL);
Erwin Schmit, Delft (NL); Valentijn Heijman, Prinsenbeek (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 17 days.

(21) Appl. No.: 13/451,175

(22) Filed: Apr. 19, 2012

(65) Prior Publication Data

US 2013/0223625 A1 Aug. 29, 2013

Related U.S. Application Data

(60) Provisional application No. 61/603,846, filed on Feb. 27, 2012.

(51) Int. Cl.
*H04N 1/44* (2006.01)

(52) U.S. Cl.
USPC .......................................................... 380/243

(58) Field of Classification Search
None
See application file for complete search history.

(56) References Cited

U.S. PATENT DOCUMENTS

| 2009/0251282 A1* | 10/2009 | Fitzgerald et al. ............ 340/5.31 |
| 2010/0081414 A1* | 4/2010 | Poisner ......................... 455/411 |
| 2010/0110212 A1 | 5/2010 | Kuwahara et al. |
| 2010/0268466 A1* | 10/2010 | Amutham ...................... 701/301 |
| 2011/0234829 A1 | 9/2011 | Gagvani et al. |
| 2012/0067958 A1* | 3/2012 | Rowe ....................... 235/462.07 |

FOREIGN PATENT DOCUMENTS

JP 2000261707 A 9/2000

OTHER PUBLICATIONS

International Searching Authority, PCT International Search Report, PCT Application No. PCT/IB2013/000804, Aug. 21, 2013, 10 pages, European Patent Office, The Netherlands.
Later Publication No. WO2013/128287A3 dated Sep. 6, 2013 re Application No. PCT/IB2013/000804 and copy of ISR.

* cited by examiner

*Primary Examiner* — Brandon Hoffman
(74) *Attorney, Agent, or Firm* — Arent Fox LLP

(57) ABSTRACT

A method, an apparatus, and a computer program product for configuring audiovisual equipment. An image captured by an imaging sensor of a camera may comprise an encoded pattern that includes information that can unlock a feature or function of a camera or other audiovisual equipment the information is extracted from the encoded pattern using an image processor of the camera, or communicatively coupled to the camera. The information may comprise encrypted information which may be decrypted using a unique identifier of the camera. The information may be transmitted to downstream audiovisual equipment and may be used to unlock features and functions of other devices. The other devices may include another camera.

44 Claims, 5 Drawing Sheets

CONFIGURING AUDIOVISUAL SYSTEMS

CROSS-REFERENCE TO RELATED APPLICATION

Pursuant to 35 U.S.C. §119(e), this application claims the benefit of U.S. Provisional Application Ser. No. 61/603,846 filed on Feb. 27, 2012, the contents of which are hereby incorporated by reference herein in its entirety.

BACKGROUND

1. Field

The present disclosure relates generally to video production systems, and more particularly, to systems and methods for configuring video productions systems.

2. Background

Video production systems used in, for example, television studios, or deployed at sporting events typically receive video and audio feeds from multiple cameras though various control, processing, routing and communications devices. Much of the equipment is networked and can communicate for control, monitoring and configuration purposes. Some or all of the equipment may be provisioned and configured to meet a variety of video formats, and to provide changing levels of functionality. Configuration changes may be expensive and time consuming and require upgrades or replacement of certain components.

SUMMARY

In an aspect of the disclosure, a method of configuring audiovisual equipment comprises capturing an image using an imaging sensor of a camera. The image may include an encoded pattern. In some embodiments, the encoded pattern comprises a barcode. In some embodiments, the barcode is a two dimensional barcode. In some embodiments, the barcode includes information encoded in color.

In an aspect of the disclosure, information is extracted from the encoded pattern using an image processor of the camera. The information may comprise encrypted information. The information may be extracted from the encoded pattern by decrypting the encrypted information using a unique identifier maintained by the camera. In some embodiments, the unique identifier comprises a serial number associated with the camera. In some embodiments, the unique identifier comprises an encryption key generated for the camera.

In some embodiments, the information may be extracted from the encoded pattern by determining whether any of the encrypted information can be decrypted by the camera using the unique identifier maintained by the camera, decrypting a portion of the encrypted information at the camera when the portion of the encrypted information can be decrypted by the camera, and transmitting the encrypted information to at least one other device communicatively coupled to the camera when some or all of the information cannot be decrypted by the camera. In some embodiments, the at least one other device is configured to decrypt the second portion of the encrypted information using a unique identifier maintained by the at least one other source.

In an aspect of the disclosure, a predefined feature of the camera or a device communicatively coupled to the camera is unlocked using the information extracted from the encoded pattern. The feature may relate to a functional aspect of the camera or the device. In some embodiments, the feature relates to an aspect ratio of the camera. In some embodiments, the feature relates to a video resolution of the camera. In some embodiments, the feature relates to a video frame rate of the camera. In some embodiments, the feature relates to an encoding format of a video output of the camera. In some embodiments, the feature relates to a camera control unit (CCU) communicatively coupled to the camera. In some embodiments, the feature relates to a gateway configured to receive video feeds from the camera and from at least one other camera. In some embodiments, the feature relates to a functional aspect of the at least one other camera. In some embodiments, the feature relates to an effect added to a video output of the camera. In some embodiments, the feature enables capture of slow motion by the camera. In some embodiments, the feature relates to generation of metadata from the video output of the camera. In some embodiments, the at least one other device comprises a video server configured to propagate a video feed from the camera through a network, and the feature relates to an encoding format used to propagate the video feed through the network.

DETAILED DESCRIPTION

Figure 1:
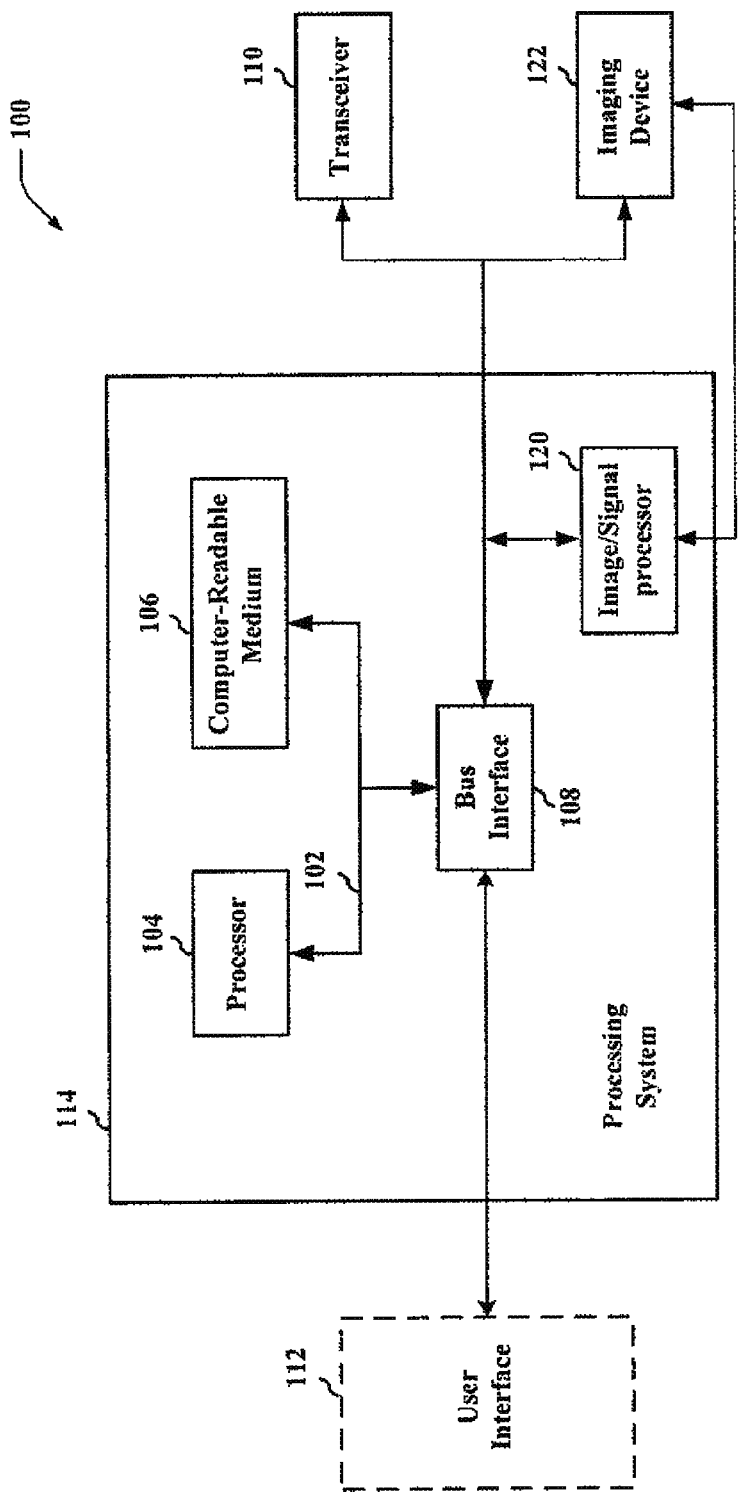
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, image processors, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, non-transitory storage such as a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, as well as a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors 104, represented generally by the processor 104 and image processor 120, signal processor 120 or other specialized processor 120, and non-transitory computer-readable media, represented generally by the computer-readable medium 106. The bus 102 may also link various other circuits such as timing sources, peripherals, voltage regulators, and power management circuits, which are well known in the art, and therefore, will not be described any further. In some embodiments, a bus interface 108 provides an interface between the bus 102 and a transceiver 110. The transceiver 110 provides a means for communicating with various other apparatus over a transmission medium hi some embodiments, bus interface 108 may provide an interface between the bus 102 and an imaging device 122. The imaging device 122 may capture a sequence of images of a scene or event to enable processing system 114 to produce a video feed. Image processor 120 may be configured to operate on pixels in the sequence of images to produce a signal representative of one or more images captured by the imaging device 122. In one example, processing system 114 may be incorporated in a camera, such that imaging device 122 comprises a CCD array or another device suitable for capturing images that provides a "raw" image signal directly to image/signal processor 120, which may process pixel information in a sequence of images to produce a standardized video output representative of a sequence of frames. In another example, imaging device 122 may comprise a camera in which image processor 120 may be employed to extract information from a signal representative of sequence of frames transmitted by imaging device 122. The extracted information may comprise a compressed video stream and metadata including background information, foreground objects, motion vectors, virtual lines, object counting, object tracking and other metadata. Depending upon the nature of the apparatus, a user interface 112 e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

By way of example and without limitation, the aspects of the present disclosure illustrated in FIG. 1 are presented with reference to systems and methods used to configure components of a video production system that may be used for production of television programming or at sports events. The various concepts presented throughout this disclosure may be implemented across a broad variety of imaging applications, including systems that capture and process video and/or still images, video conferencing systems and so on. The various concepts presented throughout this disclosure may be applied to other equipment that may be communicatively coupled to components of a video production system, including, for example, smartphones and tablet computers, as well as other computing platforms.

As will be described herein, a video production system may comprise a variety of components, which may have multiple features and perform a variety of functions. Components of the video production system may be delivered to users with a subset of the features enabled. In certain embodiments, additional features are present, but locked, in the delivered systems and can be unlocked or enabled by presenting an image to a camera of the video production system. In some embodiments, features and functions may be added by network download, by installation software delivered on a memory or other storage device, or by other suitable means. Downloaded features and functions may be installed on components of a video production system, but may be stored in a locked, inoperative format.

In certain embodiments, features and functions may be unlocked using information in an image captured by a camera. The camera may be configured to decode a coded portion of the image and to extract information used to unlock a feature of the camera or to unlock a feature or function of another device communicatively coupled to the camera. Unlocking the feature may require enablement of one or more additional functional elements of the video production system and a single encoded image may be used to unlock one or more features in one or more elements of the video productions system. For example, when a triple speed feature of a video camera is enabled, it may be necessary to enable a related feature in a control unit for the camera to permit the control unit to communicate a higher frame rate to other devices or to communicate slow motion video feeds.

Figure 2:
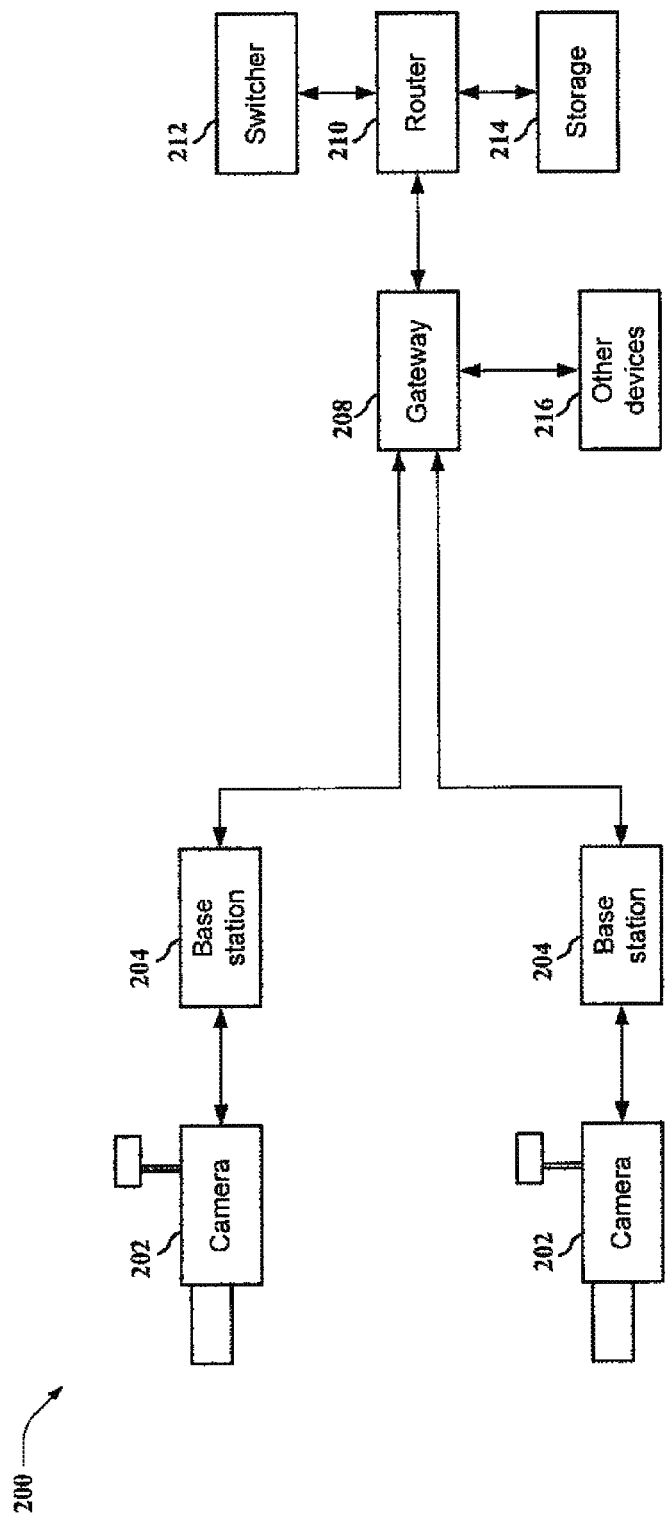
FIG. 2 is a block diagram illustrating an example of a video production system.

FIG. 2 is a block diagram 200 illustrating a video production system. One or more cameras 202 may be deployed to capture video images of a scene or event. Camera 202 typically comprises a processing system that produces an encoded video output representative of a sequence of images captured by imaging device 122. For the purposes of this description, video feeds and other signals are transmitted to downstream devices by camera 202, or a component of camera 202. A downstream signal may also comprise a signal transmitted from a downstream device to another device that is further downstream relative of the camera 202. Control, command and other signals received by camera 202, including audio signals directed to an operator, may be referred to as upstream signals, as are any other signals transmitted in the general direction of a camera 202.

In some embodiments, camera 202 may be connected to a base station 204. Base station 204 may provide power and communications services for the camera 202 and may enable, for example, transmission of the camera output over long distances. Base station 204 may support other functions including, for example, configuration, intercom, a variety of audio and other communications systems, and teleprompter systems, as well as video processing on behalf of camera 202.

Base station 204 may control and monitor the operation of one or more cameras 202. Base station 204 may support standard or proprietary control interface protocols and support various different camera types through a single command interface. Base station 204 may be used to configure and coordinate sets of cameras 202 and may provide a communications channel for transferring operational parameters between cameras 202. Base station 204 may capture a configuration for one or more cameras 202 as a scene configuration. Base station 204 may store the scene configuration and/or share the scene configuration with other system components. The scene configuration may be used at a later time to restore settings of camera 202 and/or restore other controllable features of the system. Base station 204 may cause cameras 202 to perform diagnostics and may provide status information of cameras 202 to one or more downstream devices.

One or more communications devices 208 may be deployed to serve as communications gateways and/or routers. A gateway 208 may be used to provide connections between base stations 204 and other system components Using any suitable data communications standards, including, for example, Ethernet, WiFi, cellular wireless network, etc. In some embodiments, cameras 202, base stations 204, and other system components may communicate control and audio/visual signals using a local or wide area network. Gateway 208 may provide network configuration and management services that enable other system devices 216 to communicate with other networked components and components that are not networked. Other network devices may include different types of base stations 204 and cameras 202.

A router 210 may be used to support the transmission of video feeds within the system. Router 210 may be configured to receive video feeds from one or more cameras 202, or from storage 214 and to provide some combination of those feeds to downstream components through a switcher 212. Storage 214 may comprise any audio/video recording device suitable for capturing, storing, replaying and/or forwarding video and audio feeds produced or used by a video production system. Switcher 212 may provide video and audio feeds to one or more of a production system, a transmission system, such as a microwave transmission system, etc. Router 210 may receive video for broadcast and may provide broadcast feeds to broadcast networks, video storage systems 214 and/or to other devices 216, such as network streaming servers.

Figure 3:
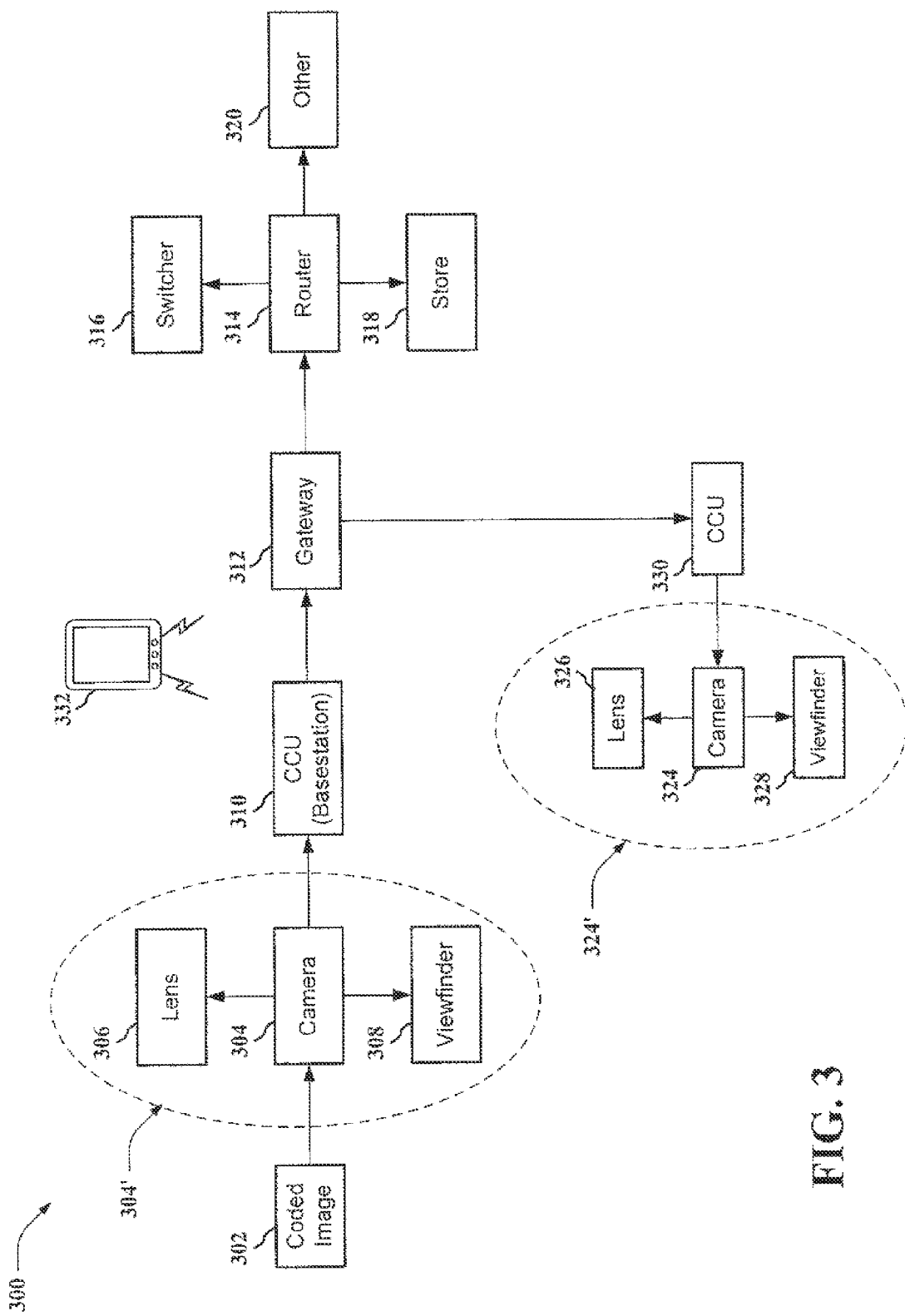
FIG. 3 is a conceptual flow diagram illustrating an example of an audiovisual configuration process.

FIG. 3 is a flow diagram 300 illustrating the operation of certain aspects of the present invention. A coded image 302 may be captured by a camera system 304'. The camera system 304' may comprise configurable components such as the base camera 304, a lens system 306 and a viewfinder 308. Base camera 304 may comprise a processing system 114 that includes one or more imaging devices 122, and an image processor 120 that processes successive frames of pixel data captured by the one or more imaging devices 122. The one or more imaging devices 122 may include three or more imaging arrays that capture images in different regions of the visible spectrum. The one or more imaging devices 122 may comprise sets of imaging devices 122 that receive light from spatially separated lenses to generate a stereoscopic or three dimensional image of a scene or object.

Lens system 306 may be controlled to provide a desired optical configuration of lenses, which configuration may specify, for example, a depth of field setting, a numerical aperture, and a focal length. Viewfinder 308 may comprise a display system configurable to match a resolution and aspect ratio setting of base camera 304.

In one example, coded image 302 comprises a barcode. Barcodes may comprise a pattern of bars, stripes squares, circles dots or other geometric shapes, where some combination of the pattern and the constituent geometric shapes encodes information. Barcode can follow a standard format such as Code 39, Code 12.8, or other alphanumeric barcode, or a numeric barcode such as Universal Product Code (UPC). Barcode may be two dimensional, such as a quick response code (OR Code), a DataMatrix code, etc. The coded image 302 may be encoded using a color coding scheme to encode information in a barcode or other pattern. The coded image 302 may include multiple barcodes in different sizes with different symbologies. The coded image 302 may comprise a barcode that includes information coded according to a proprietary or modified barcode system, such as an international mobile equipment identity (IMEI).

In certain embodiments, camera 304 may extract information from the coded image 302. In one example, an image processor 120 of the camera 304 may identify a barcode pattern in a captured image 302 and decode the pattern to extract information encoded in the barcode. The image processor 120 may extract patterns from pixel data provided by imaging device 122. The image processor 120 may first process pixel data provided by imaging device 122 to obtain a still or video image before executing one or more pattern recognition algorithms that identify a pattern in the image 302 captured by imaging device 122. In some embodiments, the image processor 120 may be configured to identify unlocking codes using pattern recognition after an operator selects an operating mode of the camera 304. In some embodiments, information is extracted from coded image 302 using a combination of image processor 120 and another processor 104 of the camera 304. For example, image processor 120 may provide information representing the geometric characteristics of a detected pattern and processor 104 may identity barcode type and decode barcode accordingly. Geometric characteristics may include overall dimensions, shapes element sizes, relative dimensions of elements and orientation of the shapes and the pattern.

In some embodiments, information extracted from the barcode comprises a key or other information used to unlock a feature of the camera system 304' or related equipment. The key may be used to decrypt instructions or data that enable a processor to perform one or more functions related to the feature. In some embodiments, the key may be used to update or create a registration record or other record that enables a desired feature. In some embodiments the key may be combined with an identifier that is uniquely associated with the camera system 304' or other equipment. The identifier may comprise a serial number of the camera 202 or related equipment, a serial number of a semiconductor device such as a processor 104, 120 or imaging device 122. The identifier may comprise information provided in configuration information and/or in identification information or an identifying code provided by an operator of the camera 202 or related equipment. In some embodiments, predefined encryption or decryption keys may be maintained by the camera 304 or related equipment. In some embodiments, encryption or decryption keys may be obtained through a network upon request generated at the camera 304 or related equipment.

In certain embodiments, the coded image 302 may be processed and decoded by a processor of one or more components of the video production system. For example, CCU 310 may comprise an image processor 120 or other processor adapted using an image processing application. In another example, a computing device 332, such as a desktop computer, a notebook computer, a tablet computer 332 or a smartphone may be communicatively coupled to the camera system 304' and may be able to receive and process the coded image 302 through a network. In the example depicted in FIG. 3, a tablet computer 332 may be configured to communicate directly or indirectly with camera system 304' using a wireless network. Tablet computer 332 may have one or more applications installed that enable decoding of the coded image 302.

In some embodiments, the encrypted information may be decoded in the camera system 304' or in related equipment. In some embodiments, base station 310 may provide decryption service or keys to the camera 304. For example, the base camera 304 may maintain keys used for decryption. The base camera 304 may be configured to decrypt information extracted from the barcode using a decryption key generated using one or more unique identifier associated with the camera system 304', such as a serial number, a model number, a registration number, etc. In some embodiments, the camera system 304' may use a public key server to decrypt the information extracted from the coded image 302. In some embodiments, the coded image 302 may provide a link to a network location that can authenticate the operator and/or identify the camera system 304' before a feature of the camera system 304' can be unlocked.

In some embodiments, information in the coded image 302 may be protected by concealing portions of the coded image 302. For example, coded image 302 may comprise one or more barcodes or barcode fragments dispersed throughout the coded image 302, according to a coded dispersion pattern known to the camera 202. In another example, the coded image 302 is processed when the camera 202 is placed into a special mode of operation. In some embodiments, the special mode of operation may be enabled using a password or other identifier that may be needed to decrypt information extracted from the coded image 302.

In some embodiments, the coded image 302 comprises information that is encrypted in a viewable pattern and that is intended to unlock a feature of one or more devices communicatively coupled to the camera system 304'. For example, the coded image 302 may include information that unlocks a feature of one or more of downstream components such as a CCU 310, a gateway 312, a router 314, a switcher 316, a storage device 318 or other downstream device 320. In some embodiments, the coded image 302 may comprise information that is encrypted in a pattern and is intended to unlock a feature of another camera system 324 or a device or component 324, 326, 328 or 330 of the other camera system 324'. In some embodiments, the coded image 302 may include information directed to multiple devices, including encrypted information that can be decoded only by another device.

Base camera 304 may recognize that the coded image 302 includes information that is directed to another device or that otherwise cannot be decoded using a key or other unique information available to camera 304. Camera 304 may optionally communicate some or all of the information extracted from the coded image 302 to one or more of downstream devices or components 310, 312, 314, 316, 318, and 330 and/or to another camera system 324'. Downstream components 310, 312, 314, 316, 318, 320 or 330 may be configured to decrypt encoded information. In some embodiments, centralized decryption can be performed by camera 304 or one of the downstream components 310, 312, 314, 316, 318, 320 or 330 for other devices that communicate with camera 304. For example, one or more of controllers 310 or 330 may perform decryption services for the other devices in the system.

In some embodiments, one or more features of a camera system 304' may be unlocked using information obtained from coded image 302. Certain features may be enabled on one or more components 304, 306, or 308 of camera system 304', on downstream components 310, 312, 314, 316, 318, 320 or 330, and/or on other camera systems 324'. For example, the feature may enable a slow motion feature of the camera 304 which may enable the camera system 304' to operate at triple speed. Certain downstream devices, such as router 314, a storage device 318 such as a digital recorder, and other devices may be reconfigured to support the slow motion/triple speed output of the camera system 304'. Other features that may be enabled or enhanced may include video resolution and frame rates. Features may be unlocked that enable the production of a video over Internet protocol (IP) output by camera system 304', base station 310 or another system component.

In some embodiments, unlocked features may enable additional image processing and/or adjustment of camera settings, thereby providing higher dynamic range, noise reduction and other functions. Unlocked features may enable other functions that provide, for example, secondary color correction and chromatic aberration reduction. In some embodiments, selectable aspect ratio and definition settings can be enabled. For example, an unlocked feature of a high definition camera system 304' may enable the production of standard definition video outputs. In another example, an unlocked feature may enable an operator to generate a still image or a snapshot from the video image. The snapshot may be encoded as a JPEG image and transmitted to another component of the video production system, stored locally or at storage device 318 of the system, and/or transmitted using Email, short message system messaging (text message), instant message, or by some other standard or proprietary communications method or system. In some embodiments, a feature of gateway 312 may enable integration of a control unit and/or camera system 324' that operates using different control or audio/video compression protocols.

The features enabled according to certain aspects of the invention may affect one or more characteristics and functions of the video production system, including aspect ratio of the camera 304, a video resolution of the camera 304, frame rate of the camera 304, and an encoding format of a video output of the camera 304. Similar features may be enabled in another camera system 324' connected to the production system. Features may also be unlocked in downstream components 310, 312, 314, 316, 318, and/or 320.

Other features may be unlocked including features related to video processing functions such as the generation of metadata from the video output of the camera 202. Metadata may include information that identifies a location or size of an object captured by the camera 202. In some embodiments, the unlocked feature may enable another device 320, such as a video server configured to propagate a video feed from the camera 202 through a network using a desired or available encoding format.

Figure 4:
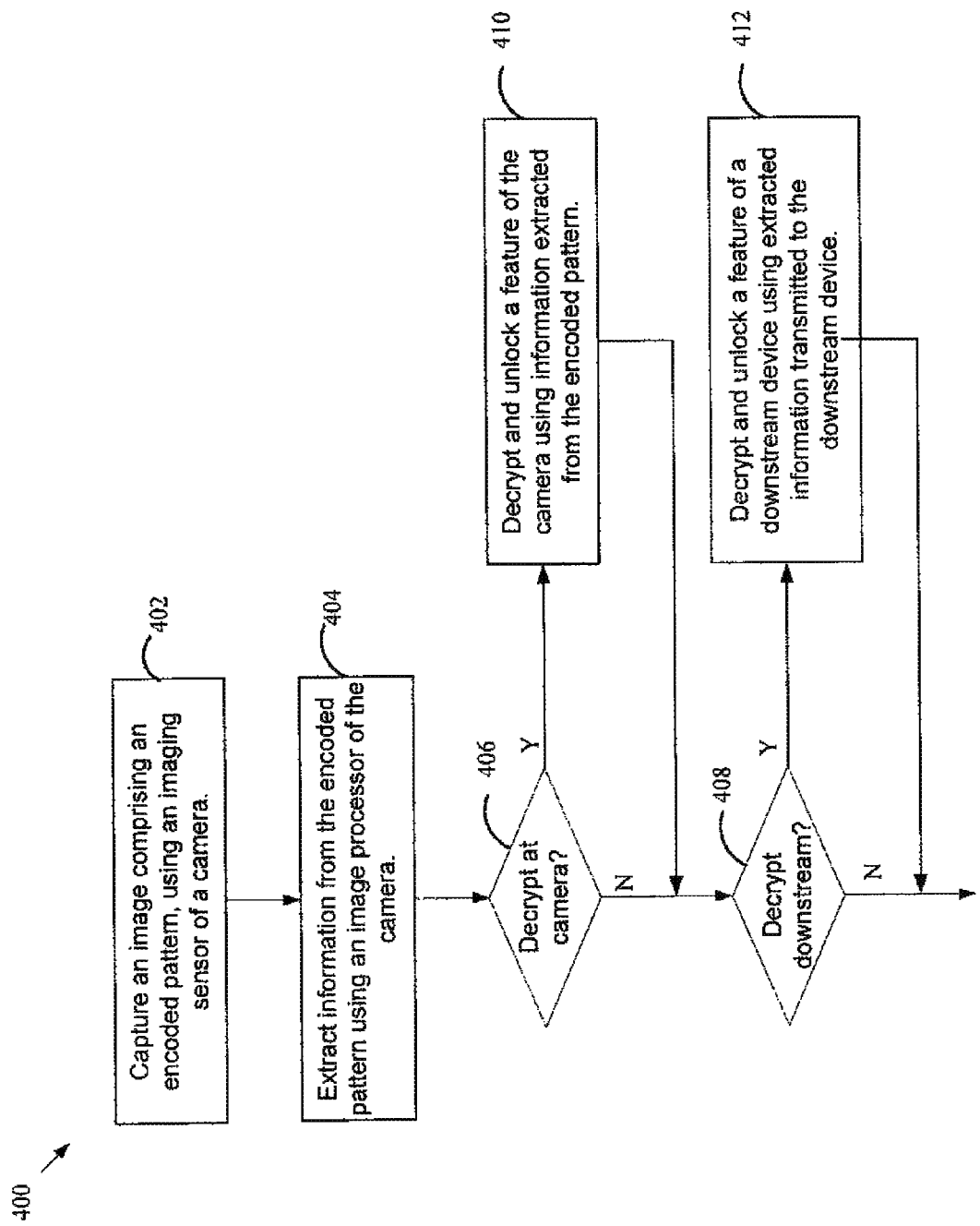
FIG. 4 is a flow chart of a method of an audiovisual configuration process.

FIG. 4 is a flow chart 400 of a method for configuring audiovisual equipment. The method may be performed by a camera 304 that may comprise one or more processors 104 and 120. At step 402, the camera 304 captures an image 302 using an imaging device 122 of camera 304, which may comprise a CCD, a complementary metal-oxide-semiconductor (CMOS) active pixel sensor, or other suitable sensor. In some embodiments, the image 302 includes an encoded pattern.

At step 404, the camera 304 extracts information from the encoded pattern using an image processor 120 of the camera 304 or an image processor 120 of another device coupled to the camera 304. For example, the image processor 120 may be provided in other components of the camera system 304, including a viewfinder 308, a CCU 310, or a computing device 332 communicatively coupled to the camera system 304', whereby, the camera 202 may provide the captured image 302 to the other component and cause the other component to extract the information from the image 302 and/or decode the encoded pattern. For example, the image 302 may be provided in a request or with a command. The decoded information extracted from the image 302 may be received by the camera system 304' for farther processing.

In some embodiments, the information comprises encrypted information. In some embodiments, the information is extracted from the encoded pattern by decrypting the encrypted information using a unique identifier maintained by the camera 304. The unique identifier may comprise a serial number associated with the camera 304. The unique identifier may comprise an encryption key generated for the camera 304.

When encrypted information is extracted from the coded image 302, then at step 406, some embodiments determine whether any of the encrypted information can be decrypted by the camera 304 using a unique identifier maintained by the camera 304. If it is determined that the camera 304 can decrypt the encrypted information, then at step 410, the camera 304 may decrypt the information and unlock a predefined feature of the camera system 304' using the information extracted from the encoded pattern. In some embodiments, the feature relates to a functional aspect of the camera 202.

When encrypted information is extracted from the coded image 302, then at step 408, some embodiments determine whether any of the encrypted information can be decrypted by at least one other device (e.g. one or more of downstream devices 310, 312, 314, 316, 318, 320 or 330) using a unique identifier maintained by the other device. In some embodiments, at least one other device is configured to decrypt encrypted information using a unique identifier maintained by the at least one other source.

If it is determined at step 408 that some or all of the encrypted information may be or should be decrypted by a downstream device, then at step 412, some or all of the encrypted information may be transmitted to at least one other device communicatively coupled to the camera 304.

In some embodiments, the encrypted information may be decrypted by at least one other device (e.g. one or more of downstream devices 310, 312, 314, 316, 318, 320 or 330 using a unique identifier maintained by the other device. In some embodiments, at least one other device is configured to decrypt encrypted information using a unique identifier maintained by the at least one other source.

In some embodiments, the feature relates to an aspect ratio of the camera 304. In some embodiments, the feature relates to a video resolution of the camera 304. In some embodiments, the feature relates to a video frame rate of the camera 304. In some embodiments, the feature relates to an encoding format of a video output of the camera 304. In some embodiments, the feature relates to a CCU 310 communicatively coupled to the camera 304. In some embodiments, the feature relates to a gateway 312 configured to receive video feeds from the camera 304 and from at least one other camera 324. In some embodiments, the feature relates to a functional aspect of the at least one other camera 324. In some embodiments, the feature relates to an effect added to a video output of the camera 304.

In some embodiments, the feature enables capture of slow motion by the camera 304. In some embodiments, the feature relates to generation of metadata from the video output of the camera 304. In some embodiments, the downstream devices comprise one or more other devices 320, such as a video server configured to propagate a video feed from the camera 304 through a network. In some embodiments, the feature relates to an encoding format used to propagate the video feed through the network.

In some embodiments, the encoded pattern comprises a barcode. In some embodiments, the barcode is a two dimensional barcode. In some embodiments, the barcode includes information encoded in color.

Figure 5:
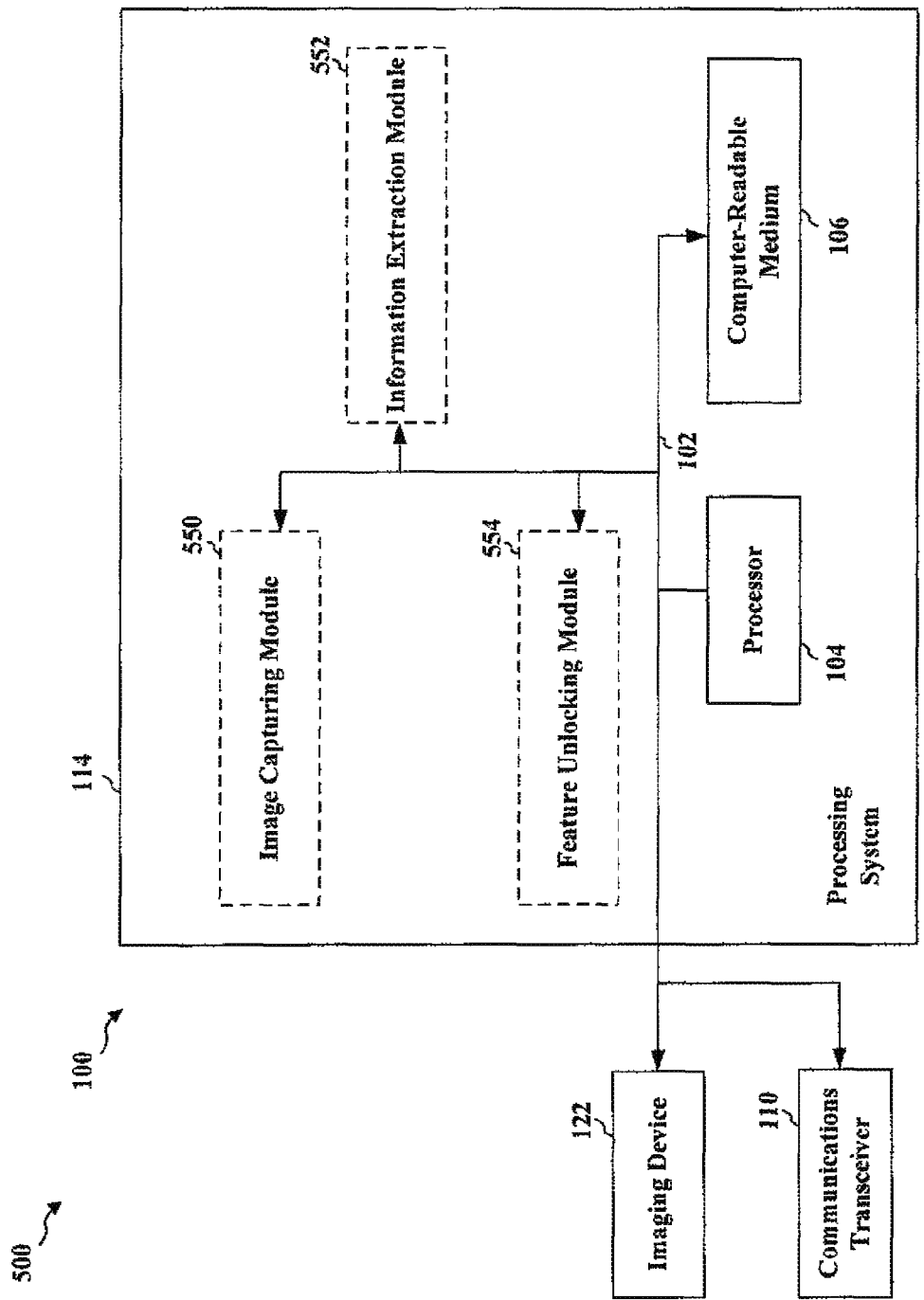
FIG. 5 is a conceptual block diagram illustrating, the functionality of an exemplary apparatus.

FIG. 5 is a conceptual block diagram 500 illustrating the functionality of an exemplary apparatus 100. The apparatus 100 includes a module 550 that captures an image 302, a module 552 that extracts information from the captured image 302 and a module 554 that unlocks a feature of the camera system 304' or a device coupled to the camera system 304.

In one configuration, module 550 captures an image 302 using an imaging device 122 of a camera 304 or an imaging device 122 and/or processor 104 coupled to the camera 304. In some embodiments, the image 302 includes an encoded pattern. In one example, the image processor 120 may be provided in other components of the camera astern 304', including a viewfinder 308, a CCU 310, or a computing device 332 communicatively coupled to the camera system 304', whereby, the camera 202 may provide the captured image 302 to the other component and cause the other component to extract the information from the image 302 and/or decode the encoded pattern. For example, the image 302 may be provided in a request or with a command. The decoded information extracted from the image 302 may be received by the camera system 304' for further processing In one configuration, module 552 extracts information from the encoded pattern using an image processor 120 of the camera 202. In some embodiments, the information comprises encrypted information. In some embodiments, the information is extracted from the encoded pattern by decrypting the encrypted information using unique identifier maintained by the camera 304. The unique identifier may comprise a serial number associated with the camera 304. The unique identifier may comprise an encryption key generated for the camera 304.

In one configuration, module 554 unlocks a predefined feature of the camera 304 or a device communicatively coupled to the camera 304 using the information extracted from the encoded pattern. In some embodiments, the feature relates to a functional aspect of the camera 304 or the connected device.

In some embodiments, the information comprises encrypted information. In some embodiments, the information is extracted from the encoded pattern by decrypting the encrypted information using a unique identifier maintained by the camera 304. The unique identifier may comprise as serial number associated with the camera 304. The unique identifier may comprise an encryption key generated for the camera 304. The camera 304 may decrypt the information and unlock a predefined feature of the camera system 304 using the information extracted from the encoded pattern. In some embodiments, the feature relates to a functional aspect of the camera 202. In some embodiments, the encrypted information may be decrypted by at least one other device (e.g. one or more of downstream devices 310, 312, 314, 316, 318, 321) or 330) using a unique identifier maintained by the other device. In some embodiments, at least one other device is configured to decrypt encrypted information using a unique identifier maintained by the at least one other source.

In some embodiments, the feature relates to an aspect ratio of the camera 304. In some embodiments, the feature relates to a video resolution of the camera 304. In some embodiments, the feature relates to a video frame rate of the camera 304. In some embodiments, the feature relates to an encoding format of a video output of the camera 304, in some embodiments, the feature relates to a CCU 310 communicatively coupled to the camera 304. In some embodiments, the feature relates to a gateway 312 configured to receive video feeds from the camera 304 and from at least one other camera 324. In some embodiments, the feature relates to a functional aspect of the at least one other camera 324. In some embodiments, the feature relates to an effect added to a video output of the camera 304.

In some embodiments, the feature enables capture of slow motion by the camera 304. In some embodiments, the feature relates to generation of metadata from the video output of the camera 304. In some embodiments, the downstream devices comprise a video server 320 configured to propagate a video feed from the camera. 304 through a network. In some embodiments, the feature relates to an encoding format used to propagate the video feed through the network.

In some embodiments, the encoded pattern comprises a barcode. In some embodiments, the barcode is a two dimensional barcode. In some embodiments, the barcode includes information encoded in color.

The aforementioned means may employ one or more processing system 114 configured to perform the functions recited by the aforementioned means. As described supra, the processing system 114 may include processor 104 and image or signal processor 120. As such, in one configuration, the aforementioned means may be the processor 104 and image or signal processor 120 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of configuring audiovisual equipment, comprising:
   capturing an image using an imaging sensor of a camera communicatively coupled to a device, the device for processing audiovisual data from the camera, wherein the camera or the device has a functional aspect configured to a first configuration, and wherein the image includes an encoded pattern;
   extracting information from the encoded pattern using an image processor; and
   unlocking a predefined feature of the camera or the device using the extracted information, wherein the feature is unlocked by reconfiguring the functional aspect of the camera or the device from the first configuration to a second configuration, and wherein reconfiguring the functional aspect of the device reconfigures the device from processing the audiovisual data according to the first configuration to processing the audiovisual data according to the second configuration.

2. The method of claim 1, wherein the information comprises encrypted information.

3. The method of claim 2, wherein extracting the information from the encoded pattern includes decrypting the encrypted information using a unique identifier maintained by the camera.

4. The method of claim 3, wherein the unique identifier comprises a serial number associated with the camera.

5. The method of claim 3, wherein the unique identifier comprises an encryption key generated for the camera.

6. The method of claim 3, wherein the image processor is an image processor of the camera, and wherein extracting the information from the encoded pattern includes:
   determining whether any of the encrypted information can be decrypted by the camera using the unique identifier maintained by the camera;
   decrypting a portion of the encrypted information at the camera when the portion of the encrypted information can be decrypted by the camera; and
   transmitting the encrypted information to at least one other device communicatively coupled to the camera when some or all of the information cannot be decrypted by the camera.

7. The method of claim 6, wherein the at least one other device is configured to decrypt a second portion of the encrypted information using a unique identifier maintained by the at least one other device.

8. The method of claim 1, wherein the feature relates to an aspect ratio of the camera.

9. The method of claim 1, wherein the feature relates to a video resolution of the camera.

10. The method of claim 1, wherein the feature relates to a video frame rate of the camera.

11. The method of claim 1, wherein the feature relates to an encoding format of a video output of the camera.

12. The method of claim 1, wherein the feature relates to a camera control unit communicatively coupled to the camera.

13. The method of claim 1, wherein the feature relates to a gateway configured to receive video feeds from the camera and from at least one other camera.

14. The method of claim 13, wherein the feature relates to a functional aspect of the at least one other camera.

15. The method of claim 1, wherein the feature relates to an effect added to a video output of the camera.

16. The method of claim 1, wherein the feature enables capture of slow motion by the camera.

17. The method of claim 1, wherein the feature relates to generation of metadata from a video output of the camera.

18. The method of claim 1, wherein the device comprises a video server configured to propagate a video feed from the camera through a network, and wherein the feature relates to an encoding format used to propagate the video feed through the network.

19. The method of claim 1, wherein the encoded pattern comprises a barcode.

20. The method of claim 19, wherein the barcode is a two dimensional barcode.

21. The method of claim 20, wherein the barcode includes information encoded in color.

22. The method of claim 1, wherein extracting the information from the encoded pattern includes:
providing the image to one or more of a camera control unit (CCU) and a base station; and
causing the CCU or the base station to extract the information from the image and decode the encoded pattern.

23. The method of claim 1, wherein extracting the information from the encoded pattern includes:
providing the image to a computing device communicatively coupled to the camera; and
receiving from the computing device decoded information extracted from the image.

24. A camera apparatus, comprising:
means for capturing an image using an imaging sensor of a camera communicatively coupled to a device, the device for processing audiovisual data from the camera, wherein the camera or the device has a functional aspect configured to a first configuration, and wherein the image includes an encoded pattern;
means for extracting information from the encoded pattern using an image processor of the camera; and
means for unlocking a predefined feature of the camera or the device using the extracted information, wherein the feature is unlocked by reconfiguring the functional aspect of the camera or the device from the first configuration to a second configuration, and wherein reconfiguring the functional aspect of the device reconfigures the device from processing the audiovisual data according to the first configuration to processing the audiovisual data according to the second configuration.

25. The camera apparatus of claim 24, wherein the information comprises encrypted information.

26. The camera apparatus of claim 25, wherein the means for extracting the information from the encoded pattern decrypts the encrypted information using a unique identifier maintained by the camera.

27. The camera apparatus of claim 26, wherein the unique identifier comprises a serial number associated with the camera.

28. The camera apparatus of claim 26, wherein the unique identifier comprises an encryption key generated for the camera.

29. The camera apparatus of claim 26, wherein the means for extracting the information from the encoded pattern determines whether any of the encrypted information can be decrypted by the camera using the unique identifier maintained by the camera and, based on the determination, the means for extracting the information decrypts a portion of the encrypted information at the camera when the portion of the encrypted information can be decrypted by the camera, and transmits the encrypted information to at least one other device communicatively coupled to the camera when some or all of the information cannot be decrypted by the camera.

30. The camera apparatus of claim 29, wherein the at least one other device is configured to decrypt a second portion of the encrypted information using a unique identifier maintained by the at least one other device.

31. The camera apparatus of claim 24, wherein the feature relates to one or more of an aspect ratio of the camera and a video resolution of the camera.

32. The camera apparatus of claim 24, wherein the feature relates to one or more of a video frame rate of the camera and an encoding format of a video output of the camera.

33. The camera apparatus of claim 24, wherein the feature relates to a camera control unit communicatively coupled to the camera.

34. The camera apparatus of claim 24, wherein the feature relates to a gateway configured to receive video feeds from the camera and from at least one other camera.

35. The camera apparatus of claim 34, wherein the feature relates to a functional aspect of the at least one other camera.

36. The camera apparatus of claim 24, wherein the feature relates to an effect added to a video output of the camera.

37. The camera apparatus of claim 24, wherein the feature enables capture of slow motion by the camera.

38. The camera apparatus of claim 24, wherein the feature relates to generation of metadata from a video output of the camera.

39. The camera apparatus of claim 24, wherein the device comprises a video server configured to propagate a video feed from the camera through a network, and wherein the feature relates to an encoding format used to propagate the video feed through the network.

40. The camera apparatus of claim 24, wherein the encoded pattern comprises a barcode.

41. The camera apparatus of claim 24, wherein the means for extracting the information from the encoded pattern provides the image to one or more of a camera control unit (CCU) and a base station, and causes the CCU or the base station to extract the information from the image and decode the encoded pattern.

42. The camera apparatus of claim 24, wherein the means for extracting the information from the encoded pattern provides the image to a computing device communicatively coupled to the camera, and receives from the computing device, decoded information extracted from the image.

43. A computer program product, comprising:
a computer-readable medium comprising code for:
capturing an image using an imaging sensor of a camera communicatively coupled to a device, the device for processing audiovisual data from the camera, wherein the camera or the device has a functional aspect configured to a first configuration, and wherein the image includes an encoded pattern;
extracting information from the encoded pattern using an image processor of the camera; and
unlocking a predefined feature of the camera or the device using the extracted information, wherein the feature is unlocked by reconfiguring the functional aspect of the camera or the device from the first configuration to a second configuration, and wherein reconfiguring the functional aspect of the device reconfigures the device from processing the audiovisual data according to the first configuration to processing the audiovisual data according to the second configuration.

44. An apparatus for configuring a camera, comprising:
a processing system configured to:
  capture an image using an imaging sensor of the camera communicatively coupled to a device, the device for processing audiovisual data from the camera, wherein the camera or the device has a functional aspect configured to a first configuration, and wherein the image includes an encoded pattern;
  extract information from the encoded pattern using an image processor of the camera; and
  unlock a predefined feature of the camera or the device using the extracted information, wherein the feature is unlocked by reconfiguring the functional aspect of the camera or the device from the first configuration to a second configuration, and wherein reconfiguring the functional aspect of the device reconfigures the device from processing the audiovisual data according to the first configuration to processing the audiovisual data according to the second configuration.

* * * * *